United States Patent
Huang et al.

(10) Patent No.: US 9,943,967 B2
(45) Date of Patent: Apr. 17, 2018

(54) FIVE-DEGREE-OF-FREEDOM HYBRID ROBOT WITH ROTATIONAL SUPPORTS

(71) Applicant: Tianjin University, Tianjin (CN)

(72) Inventors: Tian Huang, Tianjin (CN); Chenglin Dong, Tianjin (CN); Haitao Liu, Tianjin (CN); Xuda Qin, Tianjin (CN); Jiangping Mei, Tianjin (CN); Qi Liu, Tianjin (CN); Manxin Wang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 15/397,793

(22) Filed: Jan. 4, 2017

(65) Prior Publication Data

US 2017/0113356 A1    Apr. 27, 2017

Related U.S. Application Data

(63) Continuation of application No. PCT/CN2016/077464, filed on Mar. 28, 2016.

(30) Foreign Application Priority Data

Jul. 9, 2015    (CN) .......................... 2015 1 0401279

(51) Int. Cl.
*B25J 17/02*    (2006.01)

(52) U.S. Cl.
CPC . *B25J 17/0266* (2013.01); *G05B 2219/39423* (2013.01)

(58) Field of Classification Search
CPC . B25J 17/0258; B25J 17/0266; B25J 17/0275
See application file for complete search history.

(56) References Cited

U.S. PATENT DOCUMENTS

| | | |
|---|---|---|
| 4,732,525 A | 3/1988 | Neumann |
| 4,790,718 A | 12/1988 | Vickers |
| | (Continued) | |

FOREIGN PATENT DOCUMENTS

| | | | |
|---|---|---|---|
| CN | 1212221 C | | 7/2005 |
| CN | 102699898 A | * | 10/2012 |
| | (Continued) | | |

OTHER PUBLICATIONS

International Search Report dated Jun. 20, 2016 from corresponding International Patent Application No. PCT/CN2016/077464, 6 pages.
(Continued)

*Primary Examiner* — Gerald McClain
(74) *Attorney, Agent, or Firm* — Locke Lord LLP; Tim Tingkang Xia, Esq.

(57) ABSTRACT

The present disclosure discloses a five-degree-of-freedom hybrid robot with rotational supports. A first and a second fixed shaft seats are rotatably connected to a first and a second rotational support through a hinge, respectively. One end of a first length adjustment device runs through the first rotational support, and the other end is fixedly connected to a moving platform. One end of each of the second and third length adjustment devices runs through the first rotational support and is then connected to the moving platform, respectively. Middle portions of the first, second and third length adjustment devices are each hinged onto the first rotational support. One end of a fourth length adjustment device runs through the second rotational support and is connected to the moving platform. Middle portion of the fourth length adjustment device is hinged onto the second rotational support.

8 Claims, 5 Drawing Sheets

(56) References Cited

U.S. PATENT DOCUMENTS

| | | | |
|---|---|---|---|
| 2005/0001368 A1 | 1/2005 | Schwaar et al. | |
| 2006/0241810 A1* | 10/2006 | Zhang | B25J 17/0266 |
| | | | 700/245 |
| 2008/0193241 A1* | 8/2008 | Huang | B25J 17/0266 |
| | | | 74/490.07 |
| 2013/0087004 A1* | 4/2013 | Neumann | B25J 17/0266 |
| | | | 901/19 |

FOREIGN PATENT DOCUMENTS

| | | |
|---|---|---|
| CN | 102699899 A * | 10/2012 |
| CN | 102699900 A | 10/2012 |
| CN | 102699902 A | 10/2012 |
| CN | 104526684 A | 4/2015 |
| CN | 104985596 A | 10/2015 |
| CN | 204913901 U | 12/2015 |
| EP | 0 200 369 A1 | 11/1986 |
| EP | 0 202 206 A1 | 11/1986 |
| EP | 0 674 969 A1 | 10/1995 |
| GB | 2 173 472 A | 10/1986 |

OTHER PUBLICATIONS

Yonglei et al.; "Stiffness Analysis of a 6-DOF Hybrid Robot"; Journal of Mechanical Engineering, vol. 51, No. 7, Apr. 2015, 7 pages.

* cited by examiner

FIVE-DEGREE-OF-FREEDOM HYBRID ROBOT WITH ROTATIONAL SUPPORTS

CROSS REFERENCES TO RELATED APPLICATIONS

This application is a Continuation Application of PCT Application No. PCT/CN2016/077464, filed Mar. 28, 2016 and based upon and claiming the benefit of priority from Chinese patent application CN201510401279.9, filed Jul. 9, 2015, the entire content of all of which are incorporated herein by reference.

TECHNICAL FIELD

The present disclosure relates to a hybrid robot and in particular to a five-degree-of-freedom hybrid robot with rotational supports.

BACKGROUND OF THE PRESENT DISCLOSURE

The published patents GB2173472 (which patent family disclosed as EP0200369, U.S. Pat. No. 4,790,718), SE8502327 (which patent family disclosed as U.S. Pat. No. 4,732,525) and EP0674969 (which patent family disclosed as U.S. Pat. No. 6,336,375) have disclosed a hybrid robot, which comprises a three degree-of-freedom parallel mechanism and a two degree-of-freedom wrist connected in series to the parallel mechanism. The parallel mechanism includes three driving length adjustment devices that are stretchable in an axial direction, wherein one end of each of the driving length adjustment devices is connected to a rack through a two-degree-of-freedom hinge, while the other end thereof is connected to a moving platform through a three-degree-of-freedom hinge; a driven length adjustment device is further provided in this structure, with one end being fixedly connected to the moving platform while the other end being connected to the rack through a two-degree-of-freedom hinge. However, in such a robot, as the hinges of the driving length adjustment devices connected to the moving platform are three-degree-of-freedom hinges and each of the driving length adjustment devices is connected to a rack through a two-degree-of-freedom hinge, the structure is complicated in the mechanism.

Patent CN102699899A disclosed an over-constrained hybrid robot, which also comprises a three degree-of-freedom parallel mechanism and a two degree-of-freedom wrist connected in series to the parallel mechanism. The parallel mechanism includes three driving length adjustment devices that are stretchable in an axial direction, and a driven length adjustment device, wherein two of the driving length adjustment devices are connected to a moving platform through single-degree-of-freedom hinges and symmetrically arranged on left and right sides of the driven length adjustment device such that they are placed in the same plane; and, the other one of the driving length adjustment devices is connected to the moving platform through a three-degree-of-freedom hinge and arranged below the driven length adjustment device. This robot reduces number of single-degree-of-freedom hinges, but requires strict manufacture and mounting accuracy due to the over-constrained structure. In addition, each length adjustment device is connected to a rack through a two-degree-of-freedom hinge, respectively, so the structure is complicated and the manufacturing process of the rack is relatively complicated.

Patent CN1212221C disclosed a four-degree-of-freedom hybrid robot, which comprises a parallel mechanism with two degrees of freedom and a two-degree-of-freedom wrist connected in series to the parallel mechanism. However, the parallel mechanism only can realize a planar motion.

SUMMARY OF THE PRESENT DISCLOSURE

The present disclosure is intended to provide a five-degree-of-freedom hybrid robot with rotational supports, which effectively reduces the number of hinges, the mass of base platform, the manufacturing cost, and is convenient for real-time control.

The present disclosure employs the following technical solutions: a five-degree-of-freedom hybrid robot with rotational supports comprises a two degree-of-freedom wrist and a moving platform with a tail end in series connection to the wrist, and a first length adjustment device, a second length adjustment device, a third length adjustment device and a fourth length adjustment device, a first rotational support and a second rotational support are further provided; wherein a first fixed shaft seat is connected to each of two ends of the first rotational support through a revolute hinge, respectively; a second fixed shaft seat is connected to each of two ends of the second rotational support through revolute hinges, respectively; one end of the first length adjustment device runs through middle portion of the first rotational support, and the other end is rigidly fixed to the moving platform; one end of each of the second and third length adjustment devices runs through the first rotational support, and the other end is connected to the moving platform through a second hinge and a third hinge, respectively; the second and the third length adjustment devices are symmetrically placed on two sides of the first length adjustment device; middle portions of all the first, second and third length adjustment devices are connected to the first rotational support through revolute hinges, respectively; and one end of the fourth length adjustment device runs through the second rotational support, and the other end is connected to the moving platform through a fourth hinge, and middle portion of the fourth length adjustment device is connected to the second rotational support through a revolute hinge.

The fourth hinge is a spherical hinge with three-rotation-degree-of-freedom, and three rotational axes thereof are non-collinear and intersected at one point.

The rotational axes connecting the first, second and third length adjustment devices with the first rotational support are parallel to each other, and are perpendicularly intersected with the rotational axis connecting the first rotational support with two first fixed shaft seats; the rotational axis connecting the fourth length adjustment device with the second rotational support is perpendicularly intersected with the rotational axis connecting the second rotational support with two second fixed shaft seats.

The first rotational support comprises: a central hole located at the middle portion of the first rotational support, which is used for connecting the first length adjustment device; a second and third side holes located at two sides of the central hole, which are used for connecting the second and third length adjustment devices; and two side end holes located at two ends of the first rotational support respectively, which are used for connecting the two first fixed shaft seats; wherein the two side end holes are coaxial and share a longitudinal axis; the axes of the central hole, the second and third side holes are parallel to each other and perpendicularly intersected with the longitudinal axis.

The first length adjustment device comprises: a first telescopic rod and an inner ring sleeved thereon; a first connecting pin shaft for hinging the first rotational support is installed on an outer peripheral surface of the inner ring; two guide rails are fixedly provided on the first telescopic rod in an axial direction; and four sliders, which can be embedded into the guide rail to allow the first telescopic rod and the inner ring to form a prismatic hinge, are fixedly arranged on an inner peripheral surface of the inner ring with regard to the guide rail.

The structures of the second length adjustment device, the third length adjustment device and the fourth length adjustment device are identical, and each of the three comprises an outer tube, a servo motor and a second telescopic rod; one end of the outer tube is rigidly connected to the servo motor; one end of the second telescopic rod being inserted into the other end of the outer tube, wherein a second connecting pin shaft for hinging the first rotational support or the second rotational support is provided on an outer peripheral surface of the outer tube; two keyways are provided on the second telescopic rod in an axial direction; two guide keys, which can be embedded into the keyway and fitted with the keyway to allow the outer tube and the second telescopic rod to form a prismatic hinge, are fixedly connected onto an inner peripheral surface of the outer tube; a nut is fixedly arranged on the end of the second telescopic rod inserted into the outer tube, a driving portion of the servo motor is rigidly connected to a screw rod, and the nut is in threaded connection to the screw rod to form a spiral prismatic hinge so that a back-and-forth movement of the second telescopic rod with regard to the outer tube is realized; and, the other end of the second telescopic rod is correspondingly connected to the second hinge or the third hinge or the fourth hinge.

Both the second hinge and the third hinge are revolute hinges; and both the rotational axes connecting the second and third length adjustment devices with the moving platform are parallel to the rotational axis connecting the first length adjustment device with the first rotational support.

Both the second hinge and the third hinge can be replaced by two-rotation-degree-of-freedom universal hinges, and two-rotation-degree-of-freedom rotational axes are non-collinear and intersected at one point.

Both the second hinge and the third hinge can be replaced by three-rotation-degree-of-freedom spherical hinges, and three-rotation-degree-of-freedom rotational axes are non-collinear and intersected at one point.

In the second, third and fourth length adjustment devices, the servo motor can be replaced by a hydraulic or pneumatic actuator.

The five-degree-of-freedom hybrid robot with rotational supports provided by the present disclosure has the following advantages and positive effects:

1. the first, second and third length adjustment devices share the same rotational support, up to six revolute hinges in the mechanism can be saved in comparison with the robot disclosed in patent SE8502327, and up to two revolute hinges can be saved in comparison with the robot disclosed in patent CN102699899A; consequently the relevant mechanical parts can be saved and the manufacture cost can be thus reduced;

2. a base platform is replaced by four fixed shaft seats, which dramatically reduces mass of the robotized module, and the robot can be mounted onto different racks to build various apparatuses and manufacturing systems; meanwhile, such a structure allows two circular gratings and one linear grating to be easily mounted on the revolute hinge connecting the first rotational support with a first fixed shaft seat, on the revolute hinge connecting the first rotational support with the inner ring, and on the prismatic hinge connecting the inner ring with the first telescopic rod, so as to enable the position of the intersection of the wrist to be sensed for closed-loop control;

3. the axes of the mounting holes on the first rotational support are arranged in parallel or orthogonal, this arrangement enables these holes to be machined with one time clamping, the high accuracy can be thus achieved;

4. the motions of the first, second and third length adjustment devices are coplanar, so it is convenient for on-line monitoring as there exists analytic solution to forward displacement analysis; and 5. the second hinge and the third hinge have various practical forms, so it is convenient to adjust in accordance with different working conditions.

BRIEF DESCRIPTION OF THE DRAWINGS

FIG. 3b is a structural diagram of a cross-section A-A of FIG. 3a;

FIG. 10 is a structural diagram of Embodiment 4 of the present disclosure; in which:

5: moving platform;
6: wrist;
11: first fixed shaft seats;
12: first rotational support;
13: first length adjustment device;
23: second length adjustment device;
24: second hinge;
33: third length adjustment device;
34: third hinge;
41: second fixed shaft seats;
42: second rotational support;
43: fourth length adjustment device;
44: fourth hinge;
131: first telescopic rod;
132: inner ring;
133: guide rail;
134: slider;
135: first connecting pin shaft;
231/331/431: servo motor;
232/332/432: outer tube;
233/333/433: second telescopic rod;
234/334/434: guide key;
235/335/435: screw rod;
236/336/436: nut;
237/337/437: keyway;

238/338/438: second connecting pin shaft;
121, 122: side end holes;
123: central hole;
124: second side hole;
125: third side hole;
axis11: longitudinal axis;
axis13: first horizontal axis;
axis23: second horizontal axis; and
axis33: third horizontal axis.

DETAILED DESCRIPTION OF THE PRESENT DISCLOSURE

The five-degree-of-freedom hybrid robot with rotational supports provided by the present disclosure will be described below in details with reference to embodiments and accompanying drawings.

Figure 1:
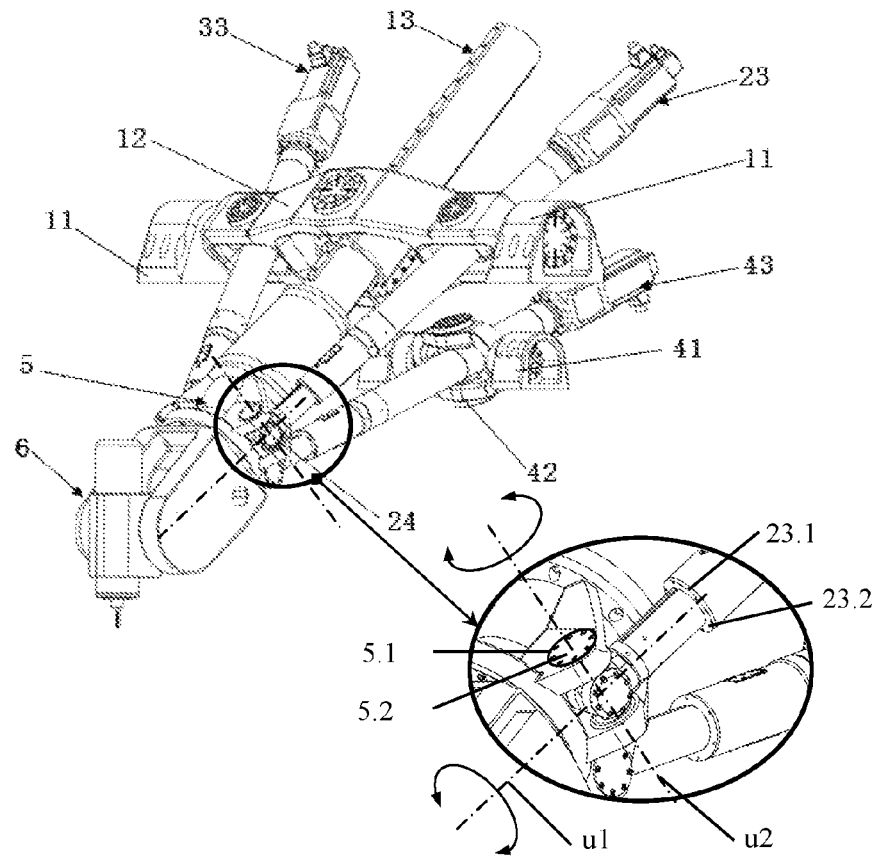
FIG. 1 is a schematic diagram of an overall structure of the present disclosure.
Figure 2:
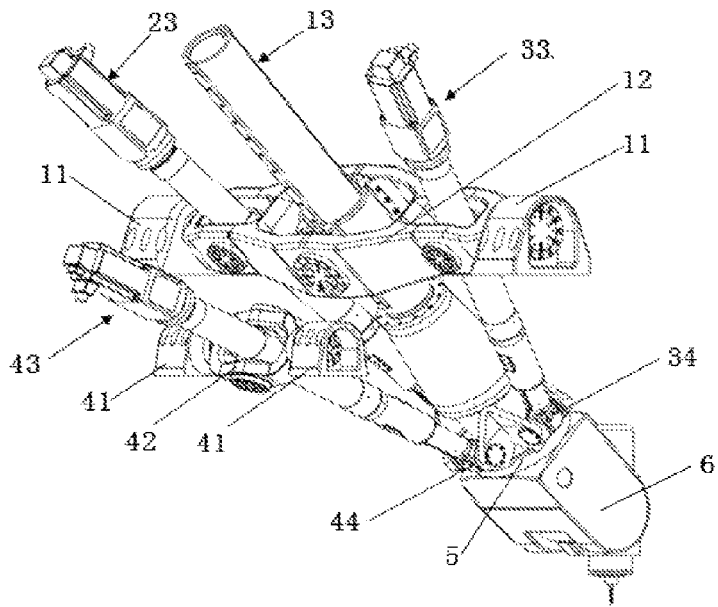
FIG. 2 is a rear view of FIG. 1.

As shown in FIGS. 1 and 2, the five-degree-of-freedom hybrid robot with rotational supports provided by the present disclosure comprises a two degree-of-freedom wrist 6 and a moving platform 5 with a tail end in series connection to the wrist 6, and a first length adjustment device 13, a second length adjustment device 23, a third length adjustment device 33, a fourth length adjustment device 43, a first rotational support 12 and a second rotational support 42. The two degree-of-freedom wrist 6 in series connection to the tail end of the moving platform 5 is a two-degree-of-freedom A/C wrist. A first fixed shaft seat 11 is rotatably connected to each of two ends of the first rotational support 12 through a revolute hinge, respectively. A second fixed shaft seat 41 is rotatably connected to each of two ends of the second rotational support 42 through a revolute hinge, respectively. One end of the first length adjustment device 13 runs through middle portion of the first rotational support 12, and the other end is fixedly connected to the moving platform 5. One end of each of the second length adjustment device 23 and the third length adjustment device 33 runs through the first rotational support 12, and the other end is connected to the moving platform 5 through a second hinge 24 and a third hinge 34, respectively. The second length adjustment device 23 and the third length adjustment device 33 are symmetrically arranged on two sides of the first length adjustment device 13. Middle portions of all the first length adjustment device 13, the second length adjustment device 23 and the third length adjustment device 33 are connected to the first rotational support 12 through revolute hinges, respectively. One end of the fourth length adjustment device 43 runs through the second rotational support 42, and the other end is connected to the moving platform 5 through a fourth hinge 44. The fourth length adjustment device 43 is arranged below the first length adjustment device 13. The fourth hinge 44 is a three-rotation-degree-of-freedom spherical hinge. The middle portion of the fourth length adjustment device 43 is rotatably connected to the second rotational support 42 through a revolute hinge.

Both the second hinge 24 and the third hinge 34 are revolute hinges; and both the rotational axes connecting the second length adjustment device 23 and the third length adjustment device 33 with the moving platform 5 are parallel to the rotational axis connecting the first length adjustment device 13 with the first rotational support 12.

Alternatively, both the second hinge 24 and the third hinge 34 are two-rotation-degree-of-freedom universal hinges, and two rotational axes u1 and u2 are non-collinear and intersected at one point. The rotational axis u1 is perpendicular to a plane 23.2 and passes through the center of a circular edge 23.1; and the rotational axis u2 is perpendicular to a plane 5.2 and passes through the center of a circular edge 5.1.

Alternatively, both the second hinge 24 and the third hinge 34 are three-rotation-degree-of-freedom spherical hinges, and rotational axes of the three-rotation-degree-of-freedom hinges are non-collinear and intersected at one point.

The rotational axis connecting the first fixed shaft seat 11 with the first rotational support 12 is perpendicularly intersected with the rotational axes connecting the first rotational support 12 with the first length adjustment device 13, the second length adjustment device 23, and the third length adjustment device 33. The rotational axes connecting the first rotational support 12 with the first length adjustment device 13, the second length adjustment device 23, and the third length adjustment device 33 are parallel to each other. The rotational axis connecting the second fixed shaft seat 41 with the second rotational support 42 is perpendicularly intersected with a rotational axis connecting the second rotational support 42 with the fourth length adjustment device 43.

Figure 3A:
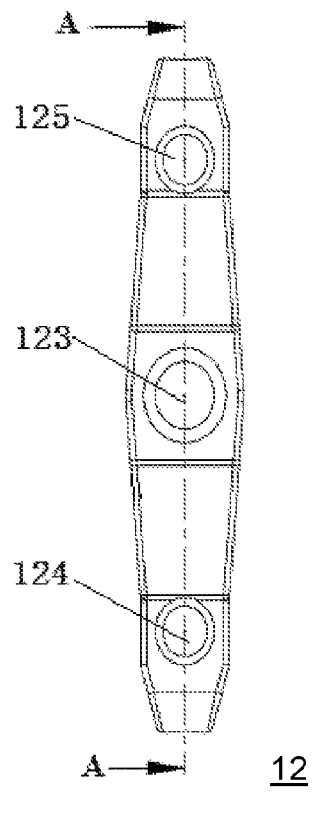
FIG. 3a is a structural diagram of a first rotational support according to the present disclosure.
Figure 3B:
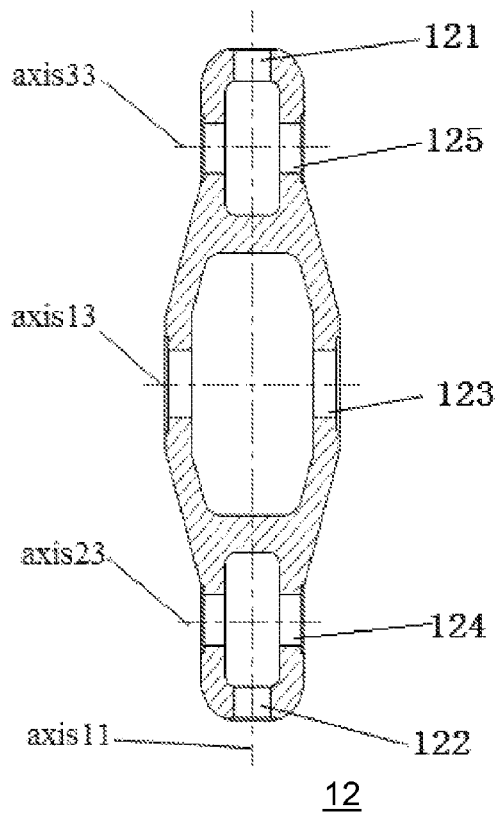

As shown in FIGS. 3a and 3b, four axes and five mounting holes are machined on first rotational support 12. The five mounting holes include: a central hole 123, which is located at the middle portion of the rotational support 12, runs through the first length adjustment device 13, and is used for rotatably connecting the first length adjustment device 13 with the first rotational support 12; a second side hole 124 and a third side hole 125, which are located on two sides of the central hole 123, run through the second length adjustment device 23 and the third length adjustment device 33 respectively, and are used for rotatably connecting the second length adjustment device 23 and the third length adjustment device 33 with the first rotational support 12; and two side end holes 122, 121, which are located at two ends of the first rotational support 12 respectively, are used for rotatably connecting the first rotational support 12 with the two first fixed shaft seats 11; wherein the two side end holes 122, 121 are coaxial and share a longitudinal axis axis11; axes of the central hole 123, the second side hole 124 and the third side hole 125 are a first horizontal axis axis13, a second horizontal axis axis23 and a third horizontal axis axis33, respectively, which are parallel to each other; and the first horizontal axis axis13 is perpendicularly intersected with the longitudinal axis axis11.

Figure 4:
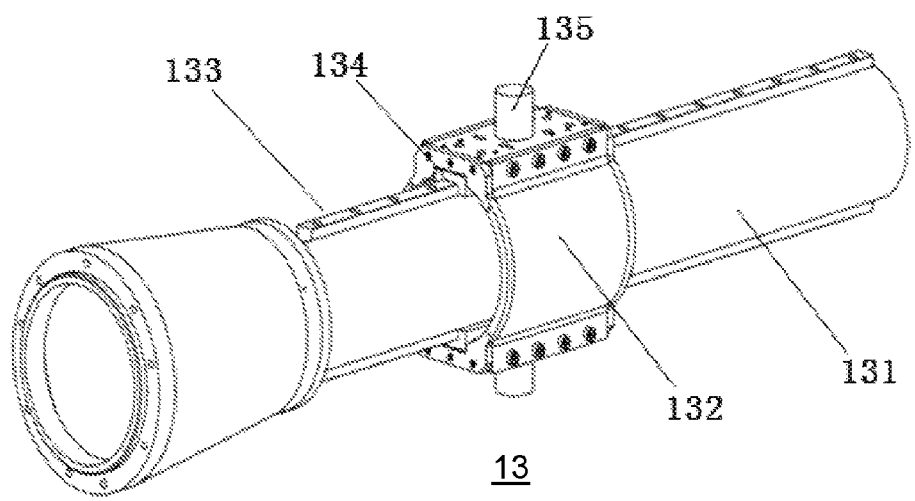
FIG. 4 is a structural diagram of a first length adjustment device according to the present disclosure.

As shown in FIG. 4, the first length adjustment device 13 comprises a first telescopic rod 131 and an inner ring 132 sleeved thereon; a first connecting pin shaft 135 for hinging the first rotational support 12 is installed on an outer peripheral surface of the inner ring 132; two guide rails 133 are fixedly provided on the first telescopic rod 131 in an axial direction; and, four sliders 134, which can be slidingly embedded into the guide rail 133 to allow the first telescopic rod 131 and the inner ring 132 to form a prismatic hinge, are fixedly provided on an inner peripheral surface of the inner ring 132 with regards to the guide rail 133.

Figure 5:
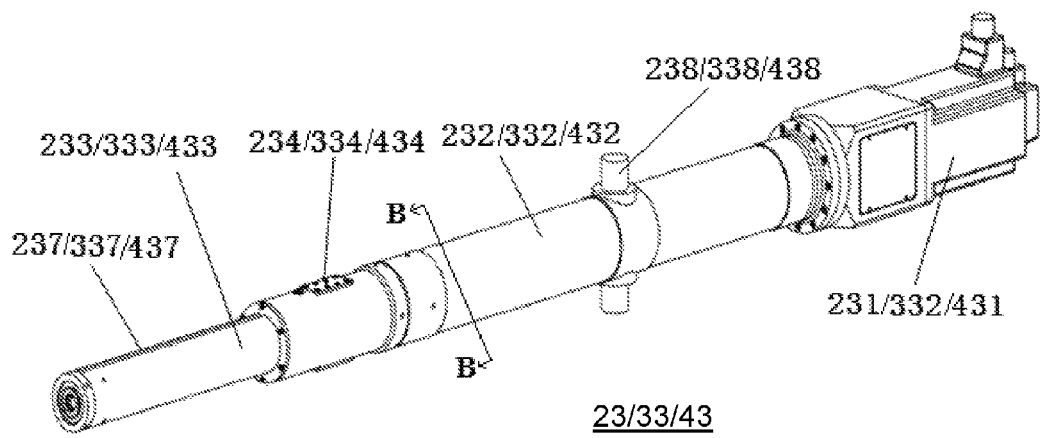
FIG. 5 is a structural diagram of each of second, third and fourth length adjustment devices according to the present disclosure.
Figure 6:
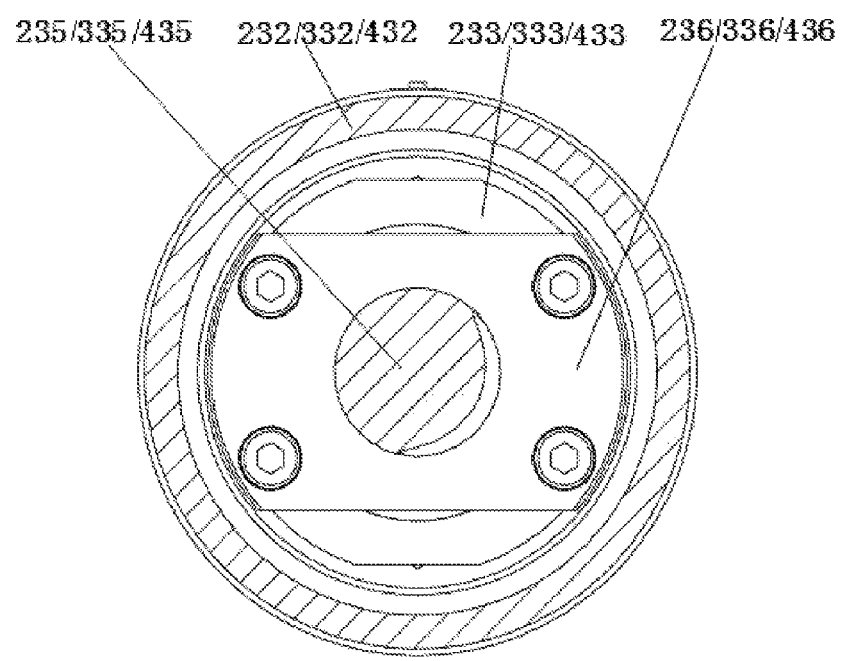
FIG. 6 is a structural diagram of a cross-section B-B of FIG. 5.

As shown in FIGS. 5 and 6, the structures of the second length adjustment device 23, the third length adjustment device 33 and the fourth length adjustment device 43 are identical, and each of the three comprises an outer tube 232/332/432, a servo motor 231/331/431 and a second telescopic rod 233/333/433; the servo motor 231/331/431 are connected to one end of the outer tube 232/332/432, one end of the second telescopic rod 233/333/433 is inserted into the other end of the outer tube 232/332/432, wherein a second connecting pin shaft 238/338/438 for hinging the first rotational support 12 or the second rotational support 42 is provided on an outer peripheral surface of the outer tube 232/332/432; two keyways 237/337/437 is provided on the second telescopic rod 233/333/433 in an axial direction; two guide keys 234/334/434, which can be embedded into the keyway 237/337/437 and fitted with the keyway to allow the outer tube 232/332/432 and the second telescopic rod 233/333/433 to form a prismatic hinge, are fixedly connected onto an inner peripheral surface of the outer tube 232/332/432; a nut 236/336/436 is fixedly arranged on the end of the second telescopic rod 233/333/433 inserted into the outer tube 232/332/432, a driving portion of the servo motor 231/331/431 is connected to a screw rod 235/335/435, and the nut 236/336/436 is in threaded connection to the screw rod 235/335/435 to form a spiral prismatic hinge so that a back-and-forth movement of the second telescopic rod 233/333/433 corresponding to the outer tube 232/332/432 is realized; and, the other end of the second telescopic rod 233/333/433 is correspondingly connected to the second hinge 24 or the third hinge 34 or the fourth hinge 44.

In the second length adjustment device 23, the third length adjustment device 33 and the fourth length adjustment device 43, the servo motor 231/331/431 can be replaced by a hydraulic or pneumatic actuator. In this case, a piston rod in the hydraulic or pneumatic actuator is connected to the second telescopic rod 233/333/433 so that the back-and-forth movement of the second telescopic rod 233/333/433 with regard to the outer tube 232/332/432 is realized.

Embodiments of practical applications of the five-degree-of-freedom hybrid robot with rotational supports provided by the present disclosure will be described below.

Figure 7:
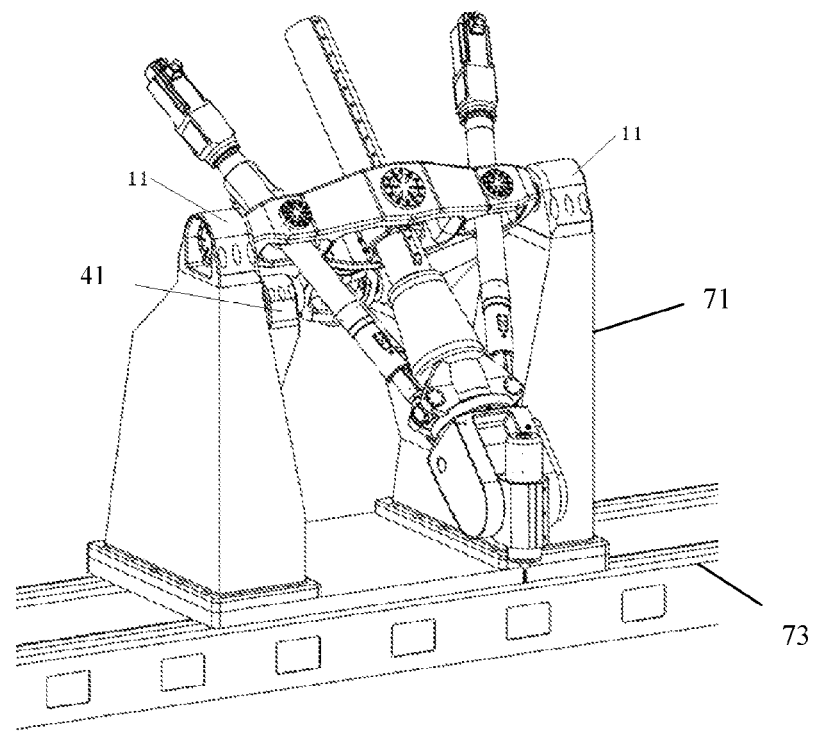
FIG. 7 is a structural diagram of Embodiment 1 of the present disclosure.

Embodiment 1:

The movable workstation shown in FIG. 7 can be configured by fixing the two first fixed shaft seats 11 and the two second fixed shaft seats 41 on a first rack 71, respectively, and fitting them with a long-stroke guide rail 73 in a horizontal direction.

Figure 8:
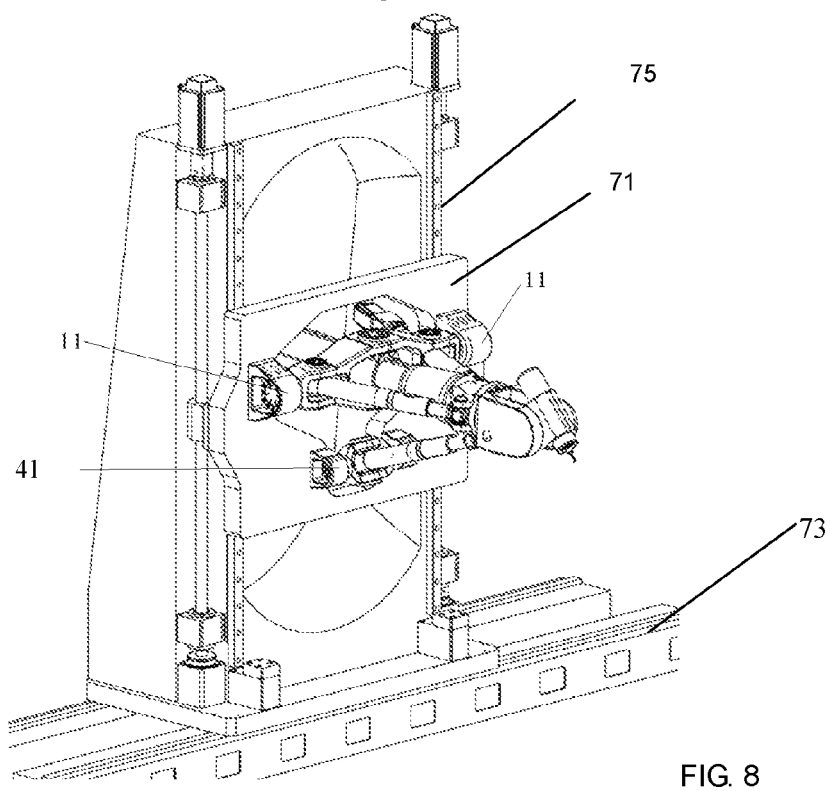
FIG. 8 is a structural diagram of Embodiment 2 of the present disclosure.

Embodiment 2:

The manufacturing apparatus shown in FIG. 8 can be configured by fixing the two first fixed shaft seats 11 and the two second fixed shaft seats 41 on the first rack 71, respectively, and fitting them with a long-stroke guide rail 75 in a vertical direction and the long-stroke guide rail 73 in the horizontal direction.

Figure 9:
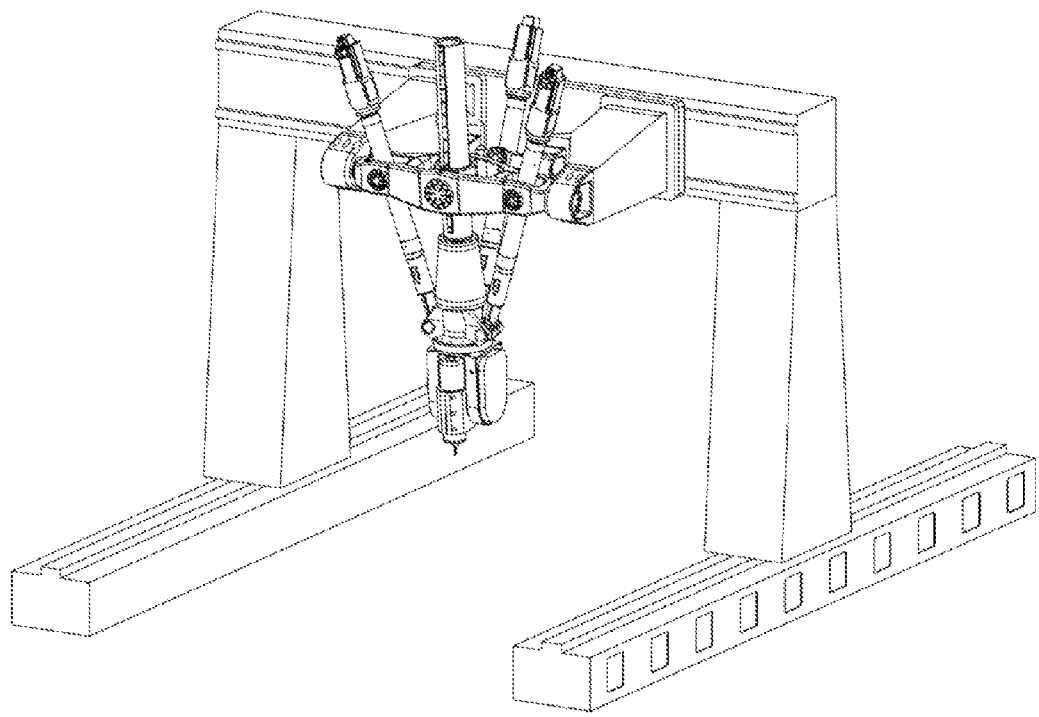
FIG. 9 is a structural diagram of Embodiment 3 of the present disclosure.

Embodiment 3:

The manufacturing apparatus shown in FIG. 9 can be configured by arranging the five-degree-of-freedom hybrid robot module provided by the present disclosure above a conventional gantry structure.

Figure 10:
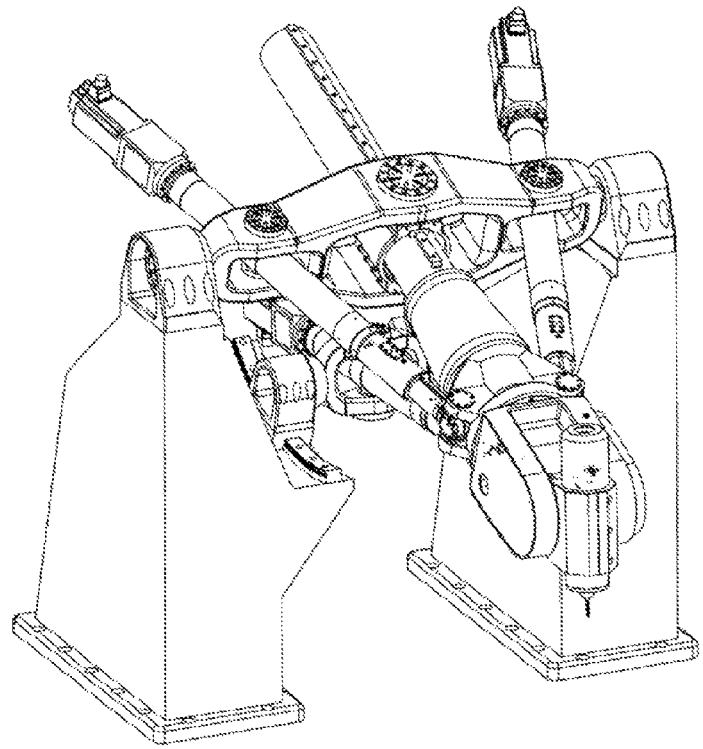

Embodiment 4:

As shown in FIG. 10, the two fixed shaft seats 11 are fixed on a rack, the two second fixed shaft seats 41 are fixed on two arc sliders, and arc guide rails are mounted on the rack. A driver drives the second fixed shaft seats 41 to move along the arc guide rails, so that the overall rotation of the five-degree-of-freedom hybrid robot module can be realized. Thus, this allows a manufacturing apparatus having a larger working space to be obtained.

Although the preferred embodiments of the present disclosure have been described hereinbefore with reference to the accompanying drawings, the present disclosure is not limited to the specific implementations described above. These specific implementations are merely exemplary but not limiting. A person of ordinary skill in the art may make various forms under the teaching of the present disclosure, without departing from the essence of the present disclosure and the protection scope of the appended claims, and all the forms shall fall into the protection scope of the present disclosure.

What is claimed is:

1. A five-degree-of-freedom hybrid robot with rotational supports comprising:
   a two degree-of-freedom wrist;
   a moving platform with a tail end in series connection to the wrist;
   a first length adjustment device;
   a second length adjustment device;
   a third length adjustment device;
   a fourth length adjustment device;
   a first rotational support;
   a second rotational support;
   a first fixed shaft seat, which is connected to each of two ends of the first rotational support through a first revolute hinge respectively; and
   a second fixed shaft seat, which is connected to each of two ends of the second rotational support through a second revolute hinge respectively,
   wherein one end of the first length adjustment device runs through middle portion of the first rotational support, and the other end is fixedly connected to the moving platform; one end of each of the second length adjustment device and the third length adjustment device runs through the first rotational support, and the other end is connected to the moving platform through a second hinge and a third hinge respectively; the second length adjustment device and the third length adjustment device are symmetrically arranged on two sides of the first length adjustment device; middle portions of all the first length adjustment device, the second length adjustment device and the third length adjustment device are connected to the first rotational support through a first set of revolute hinges respectively; and one end of the fourth length adjustment device runs through the second rotational support and the other end is connected to the moving platform through a fourth hinge, and middle portion of the fourth length adjustment device is connected to the second rotational support through a third revolute hinge;
   wherein the first rotational support comprises:
      a central hole, which is located at the middle portion of the rotational support, runs through the first length adjustment device and is used for rotatable connecting the first length adjustment device with the first rotational support;
      a second side hole and a third side hole, which are located on two sides of the central hole, runs through the second length adjustment device and the third length adjustment device respectively, and are used for rotatable connecting the second length adjustment device and the third length adjustment device with the first rotational support; and
      two side end holes, which are located at two ends of the first rotational support respectively, and are used for rotatable connecting the first rotational support with the first fixed shaft seat and the second fixed shaft seat,
         wherein the two side end holes are coaxial and share a longitudinal axis; axes of the central hole, the second side hole and the third side hole are a first horizontal axis, a second horizontal axis and a third horizontal axis respectively, which are parallel to each other; and the first horizontal axis is vertically intersected with the longitudinal axis;

wherein both the second hinge and the third hinge are universal hinges with exactly two-rotation-degree-of-freedom;

wherein the first, second and third length adjustment devices are connected with a rack via the first rotational support; and wherein the first rotational support is installed with four revolute hinges, three of which are used for connecting with the first length adjustment device, the second length adjustment device and the third length adjustment device respectively, and the fourth revolute hinge is used for connecting with the first fixed shaft seat and the second fixed shaft seat.

2. The five-degree-of-freedom hybrid robot with rotational supports according to claim 1, wherein the rotational axes connecting the first rotational support with the first length adjustment device, the second length adjustment device, and the third length adjustment device are parallel to each other, and are perpendicularly intersected with the rotational axis connecting the first rotational support with the first fixed shaft seat and the second fixed shaft seat.

3. The five-degree-of-freedom hybrid robot with rotational supports according to claim 1, wherein both the second hinge and the third hinge connect the second length adjustment device and the third length adjustment device with the moving platform.

4. The five-degree-of-freedom hybrid robot with rotational supports according to claim 1, wherein the second length adjustment device, the third length adjustment device and the fourth length adjustment device are of a same structure, and each of the three comprises an outer tube, a servo motor and a second telescopic rod, the servo motor being connected to one end of the outer tube, one end of the second telescopic rod being inserted into the other end of the outer tube, wherein a second connecting pin shaft for being hinged to the first rotational support or the second rotational support is provided on an outer peripheral surface of the outer tube; two keyways are provided on the second telescopic rod in an axial direction;

wherein two guide keys, which are embedded into the keyway and fitted with the keyway to allow the outer tube and the second telescopic rod to form a prismatic joint, are fixedly connected onto an inner peripheral surface of the outer tube; and wherein a nut is fixedly arranged on the end of the second telescopic rod inserted into the outer tube, a driving portion of the servo motor is connected to a screw rod, and the nut is in threaded connection to the screw rod to form a spiral prismatic joint so that a back-and-forth movement of the second telescopic rod corresponding to the outer tube is realized; and the other end of the second telescopic rod is correspondingly connected to the second hinge or the third hinge or the fourth hinge.

5. The five-degree-of-freedom hybrid robot with rotational supports according to claim 4, wherein in the second length adjustment device, the third length adjustment device and the fourth length adjustment device, the servo motor is a hydraulic-driven or a pneumatic-driven servo motor.

6. The five-degree-of-freedom hybrid robot with rotational supports according to claim 1, wherein the first length adjustment device comprises:

a first telescopic rod and an inner ring sleeved thereon;

a first connecting pin shaft for being hinged to the first rotational support is formed on an outer peripheral surface of the inner ring;

a guide rail fixedly provided on the first telescopic rod in an axial direction; and four sliders, which are embedded into the guide rail to allow the first telescopic rod and the inner ring to form a prismatic joint, are fixedly provided on an inner peripheral surface of the inner ring and corresponds to the guide rail.

7. The five-degree-of-freedom hybrid robot with rotational supports according to claim 1, wherein the fourth hinge is a three-rotation-degree-of-freedom spherical hinge, and three rotational axes are non-collinear.

8. The five-degree-of-freedom hybrid robot with rotational supports according to claim 1, wherein a rotational axis connecting the first fixed shaft seat with the first rotational support is vertically intersected with a rotational axis connecting the first rotational support with the first length adjustment device;

wherein a rotational axis connecting the second fixed shaft seat with the second rotational support is vertically intersected with a rotational axis connecting the second rotational support with the fourth length adjustment device;

wherein a rotational axis connecting the first length adjustment device with the first rotational support, a rotational axis connecting the second length adjustment device with the first rotational support and a rotational axis connecting the third length adjustment device with the first rotational support are parallel to each other; and wherein plane of motion of all the first length adjustment device, the second length adjustment device and the third length adjustment device are a same plane.

* * * * *